United States Patent
Wu et al.

(10) Patent No.: US 11,869,726 B2
(45) Date of Patent: Jan. 9, 2024

(54) STACKED ALUMINUM ELECTROLYTIC CAPACITOR AND METHOD FOR MANUFACTURING THE SAME

(71) Applicant: Lelon Electronics Corp., Taichung (TW)

(72) Inventors: Shiau Hong Wu, Taichung (TW); Hui Pin Chen, Taichung (TW); Chung Ming Wu, Taichung (TW)

(73) Assignee: Lelon Electronics Corp., Taichung (TW)

( * ) Notice: Subject to any disclaimer, the term of this patent is extended or adjusted under 35 U.S.C. 154(b) by 256 days.

(21) Appl. No.: 17/378,851

(22) Filed: Jul. 19, 2021

(65) Prior Publication Data
US 2022/0415583 A1    Dec. 29, 2022

(30) Foreign Application Priority Data
Jun. 24, 2021    (TW) .................................. 110207290

(51) Int. Cl.
| | |
|---|---|
| *H01G 9/00* | (2006.01) |
| *B23K 26/22* | (2006.01) |
| *B23K 26/0622* | (2014.01) |
| *B23K 26/244* | (2014.01) |

(52) U.S. Cl.
CPC ....... *H01G 9/0029* (2013.01); *B23K 26/0622* (2015.10); *B23K 26/22* (2013.01); *B23K 26/244* (2015.10)

(58) Field of Classification Search
None
See application file for complete search history.

(56) References Cited

U.S. PATENT DOCUMENTS

| | | | | |
|---|---|---|---|---|
| 5,377,073 | A  * | 12/1994 | Fukaumi ................... | H01G 9/26 29/25.03 |
| 7,835,139 | B2 * | 11/2010 | Ozawa .................... | H01G 9/012 361/523 |
| 7,916,457 | B2 | 3/2011 | Horio et al. | |
| 10,079,114 | B2 * | 9/2018 | Chen ........................ | H01G 9/15 |
| 2006/0087795 | A1 * | 4/2006 | Nagasawa .............. | H01G 9/008 361/306.3 |
| 2007/0109724 | A1 * | 5/2007 | Kurita ................... | B60R 16/027 361/508 |
| 2008/0158782 | A1 * | 7/2008 | Cheng ...................... | H01G 9/14 361/813 |

(Continued)

FOREIGN PATENT DOCUMENTS

| | | | | |
|---|---|---|---|---|
| CN | 1487542 | A | * 4/2004 | ............. H01G 9/012 |

*Primary Examiner* — Scott B Geyer
(74) *Attorney, Agent, or Firm* — Best & Flanagan LLP

(57) ABSTRACT

A stacked aluminum electrolytic capacitor includes a lead frame, a capacitor set, and at least one laser welding area. The lead frame includes a positive electrode end and a negative electrode end spaced from the positive electrode end. The capacitor set includes a plurality of stacked capacitor elements each having a positive electrode portion electrically connected to the positive electrode end and a negative electrode portion electrically connected to the negative electrode end. The at least one laser welding area is configured by a laser source capable of emitting a laser beam to perform laser welding on the positive electrode end and the positive electrode portion to form a fusion connection therebetween.

6 Claims, 7 Drawing Sheets

(56) References Cited

U.S. PATENT DOCUMENTS

| | | | | |
|---|---|---|---|---|
| 2008/0232027 A1* | 9/2008 | Ozawa | ............... | H01G 9/14 |
| | | | | 361/311 |
| 2009/0080146 A1 | 3/2009 | Horio et al. | | |
| 2011/0122544 A1* | 5/2011 | Chiu | ............... | H01G 9/26 |
| | | | | 29/25.03 |
| 2012/0262847 A1* | 10/2012 | Kawai | ............... | H01G 9/15 |
| | | | | 361/540 |

* cited by examiner

STACKED ALUMINUM ELECTROLYTIC CAPACITOR AND METHOD FOR MANUFACTURING THE SAME

BACKGROUND OF THE INVENTION

The present invention relates to a stacked aluminum electrolytic capacitor, and particularly to a stacked aluminum electrolytic capacitor suitable for automotive products and resistant to humidity and vibration.

Taiwan Patent No. TWI292164 discloses a multi-layered solid electrolytic capacitor including capacitor elements, each comprising an anode body having an anode portion and a cathode portion, the capacitor elements being stacked on top of one another and the anode portions being secured to anode mounting surfaces of anode mounting parts provided in an anode terminal by resistance welding.

However, the welded portions must be contacted and pressed under a high external force during resistance welding, which is more destructive to the product to affect the electrical properties. After welding, the volume of the metal is reduced due to the melting of the metal, resulting in more anode volume change, it is not conducive to the welding of stacked products.

In addition, in a humidity automotive environment, traditional electrolytic capacitors are likely to cause excessive capacitance failure due to moisture entering the capacitor.

In view of the above, a need exists for a novel electrolytic capacitor that mitigates and/or obviates the above drawbacks.

BRIEF SUMMARY OF THE INVENTION

One particular aspect of the present invention is to provide a stacked aluminum electrolytic capacitor and a method for manufacturing the same that reduces the number of welding passes and maintains the low impedance of the positive electrode end and high strength.

The stacked aluminum electrolytic capacitor includes a lead frame, a capacitor set, and at least one laser welding area. The lead frame includes a positive electrode end and a negative electrode end spaced from the positive electrode end. The capacitor set includes a plurality of stacked capacitor elements each having a positive electrode portion electrically connected to the positive electrode end and a negative electrode portion electrically connected to the negative electrode end. The at least one laser welding area is configured by a laser source capable of emitting a laser beam to perform laser welding on the positive electrode end and the positive electrode portion to form a fusion connection therebetween.

The positive electrode end of the lead frame has a first outer periphery. The positive electrode portion of each capacitor elements has a second outer periphery. The at least one laser welding area is formed on the first outer periphery and the second outer periphery.

The first outer periphery has at least one first end face and at least one first side face perpendicular to the at least one first end face. The second outer periphery has at least one second end face corresponding to the at least one first end face and at least one second side face corresponding to the at least one first side face.

The at least one laser welding area is formed on the at least one first end face and the at least one second end face.

The at least one laser welding area is formed on the at least one first side face and the at least one second side face.

The method for manufacturing a stacked aluminum electrolytic capacitor includes the following steps. A lead frame and a capacitor set are provided. The lead frame includes a positive electrode end and a negative electrode end spaced from the positive electrode end. The capacitor set includes a plurality of stacked capacitor elements each having a positive electrode portion electrically connected to the positive electrode end and a negative electrode portion electrically connected to the negative electrode end. A laser source is used for emitting a laser beam to perform laser welding on the positive electrode end and the positive electrode portion to form a fusion connection therebetween to provide at least one laser welding area.

The laser source is a continuous wave laser or a pulsed laser.

The laser beam has a diameter between 0.05 mm to 0.2 mm, an energy between 0.1 J to 10 J, and an instantaneous output power between 500 W to 2000 W.

The laser source is single and is configured to perform a single laser spot welding on the positive electrode end and the positive electrode portion, and the laser spot welding has a spot between 0.25 mm and 0.4 mm.

The laser beam is cylindrical or conical.

The laser welding is continuously performed in a way that a point moving track fomes in a line or a line moving track forms in a plane to form the at least one laser welding area, and a width of the moving track is 1 cm.

The positive electrode end of the lead frame has a first outer periphery. The positive electrode portion of each capacitor elements has a second outer periphery. The at least one laser welding area is formed on the first outer periphery and the second outer periphery. A gap is formed between the first outer periphery and the second outer periphery. The gap is dip-coated fluoride anti-blushing agent at least three times.

The present invention will become clearer in light of the following detailed description of illustrative embodiments of this invention described in connection with the drawings.

DETAILED DESCRIPTION OF THE INVENTION

Figure 1:
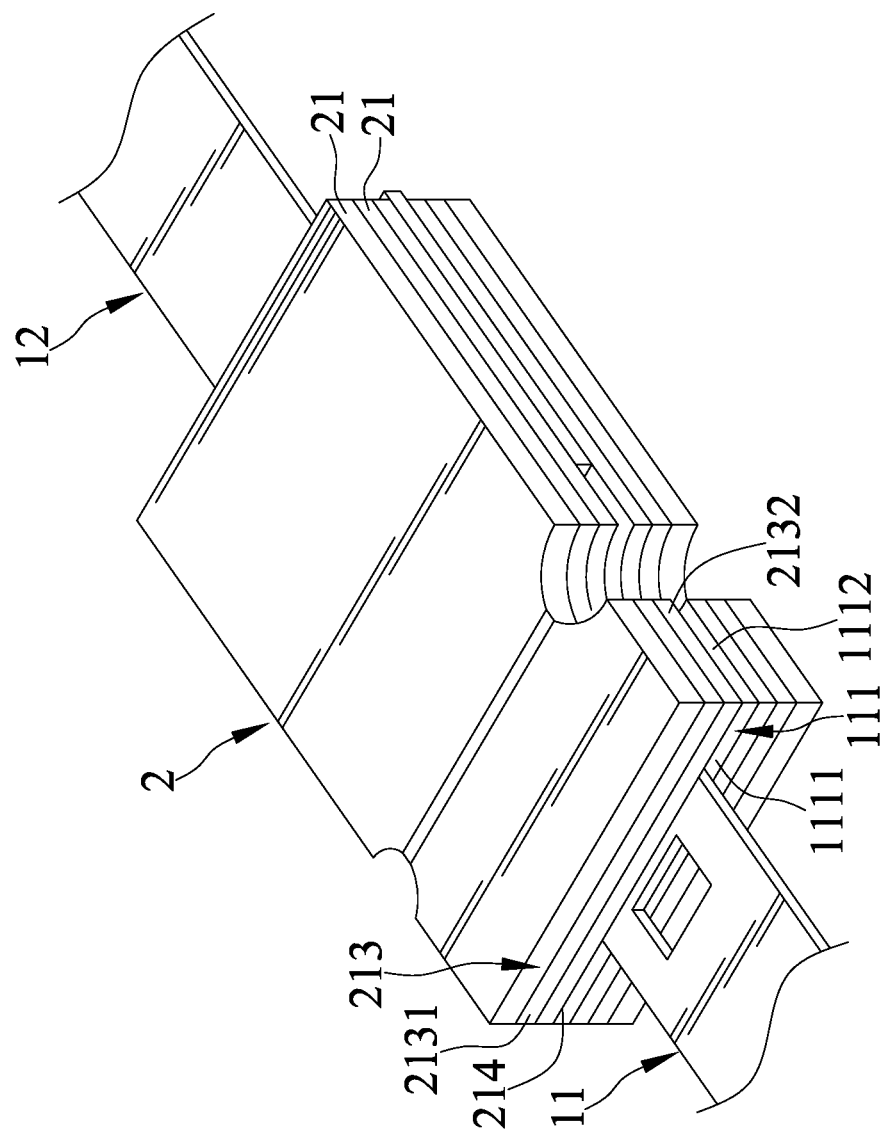
FIG. 1 is a perspective view of a stacked aluminum electrolytic capacitor of a first embodiment according to the present invention and illustrates a laser welding area not yet formed on a positive electrode end of a lead frame and a positive electrode portion of each stacked capacitor element.
Figure 2:
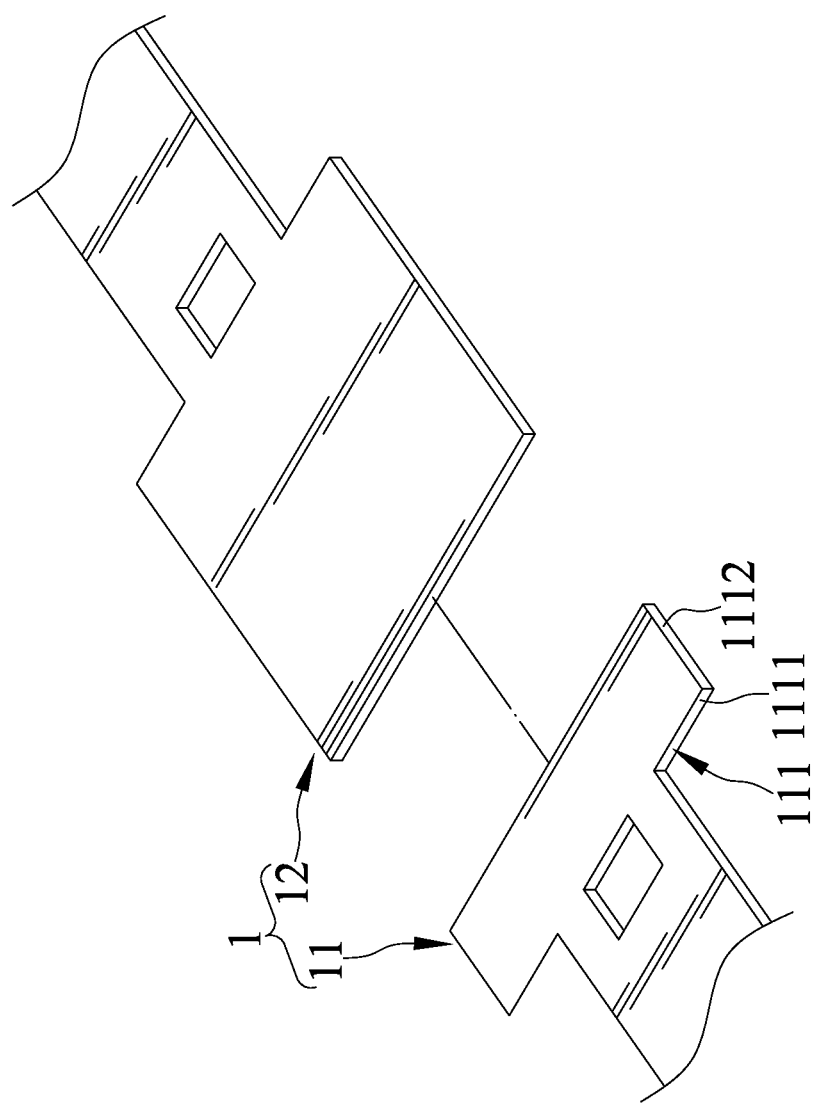
FIG. 2 is a perspective view of the lead frame of the stacked aluminum electrolytic capacitor of FIG. 1.
Figure 3:
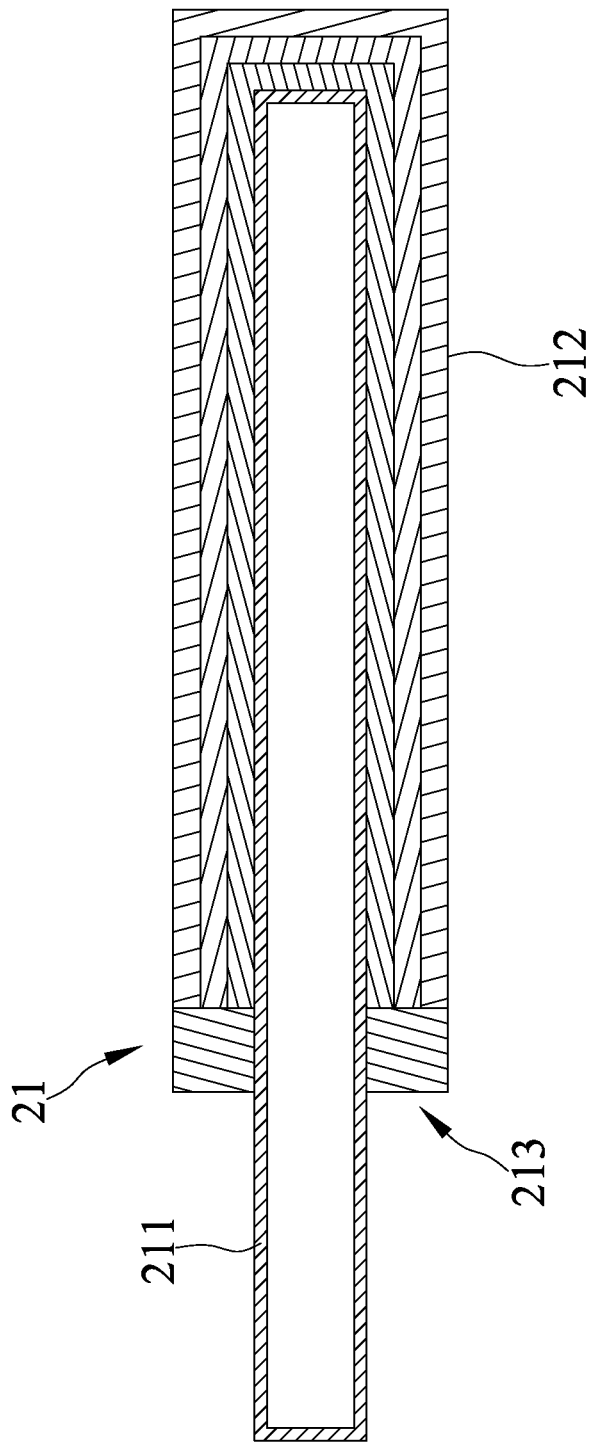
FIG. 3 is a cross-sectioned view of a stacked capacitor element of the stacked aluminum electrolytic capacitor of FIG. 1.
Figure 4:
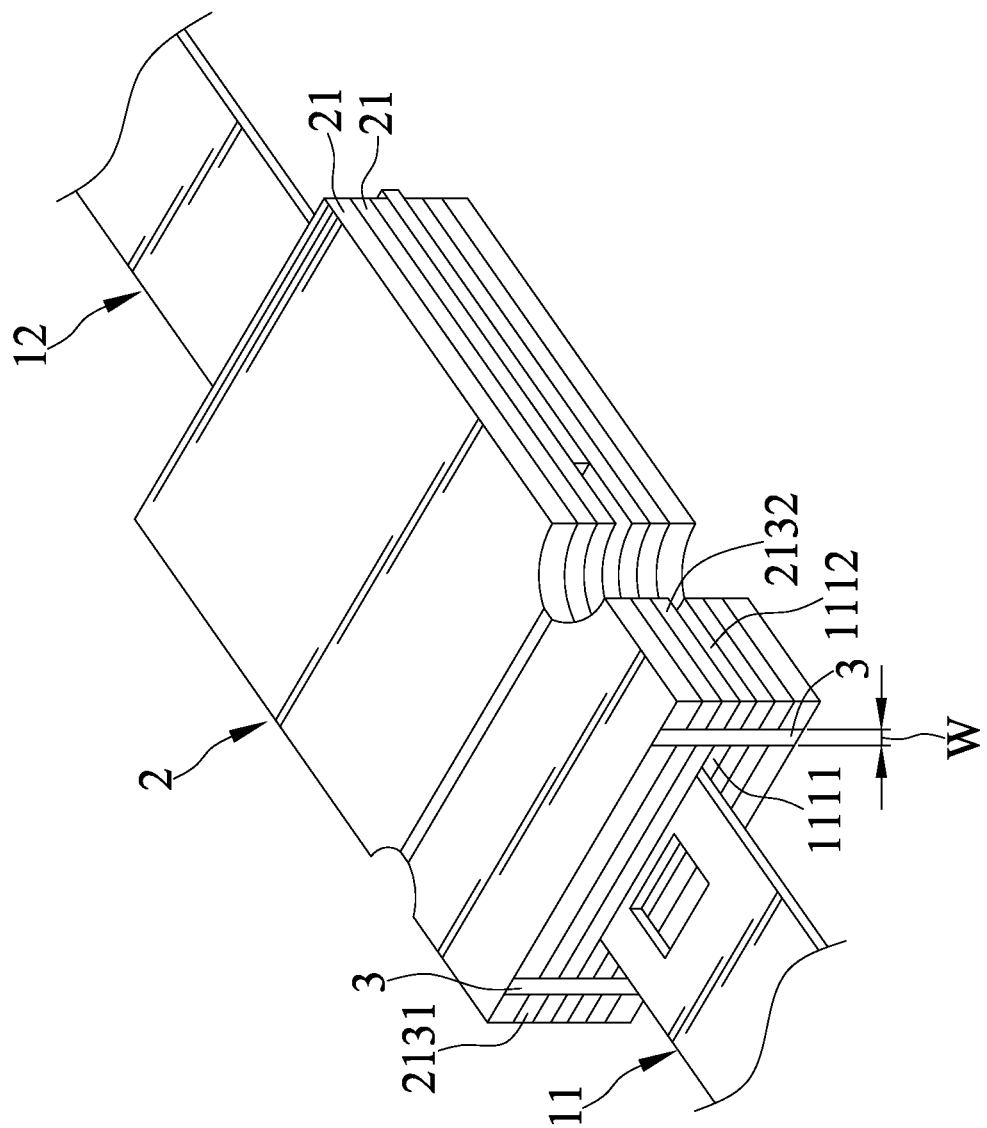
FIG. 4 is a perspective view of the stacked aluminum electrolytic capacitor of FIG. 1 and illustrates the laser welding area formed on the positive electrode end of the lead frame and the positive electrode portion of each stacked capacitor element.

FIGS. 1-4 show a stacked aluminum electrolytic capacitor of a first embodiment according to the present invention. The stacked aluminum electrolytic capacitor includes a lead frame 1, a capacitor set 2, and at least one laser welding area 3.

The lead frame 1 includes a positive electrode end 11 and a negative electrode end 12 spaced from the positive electrode end 11. The positive electrode end 11 of the lead frame 1 has a first outer periphery 111, which has at least one first end face 1111 and at least one first side face 1112 perpendicular to the first end face 1111. In the embodiment, the first outer periphery 111 may have two first end faces 1111 and two first side faces 1112 respectively connected the two first end faces 1111.

The capacitor set 2 includes a plurality of stacked capacitor elements 21 each having a positive electrode portion 211 electrically connected to the positive electrode end 11 of the lead frame 1 and a negative electrode portion 212 electrically connected to the negative electrode end 12 of the lead frame 1. The positive electrode portion 211 of each capacitor elements 21 has a second outer periphery 213, which has at least one second end face 2131 corresponding to the first end face 1111 and at least one second side face 2132 corresponding to the first side face 1112. In the embodiment, the second outer periphery 213 has two second end face 2131 and two second side face 2132 respectively connected to the two second end face 2131. Further, wherein the stacked capacitor elements 21 are stacked on the positive electrode end 11 of the lead frame 1, the two first end faces 1111 of the positive electrode end 11 can be coplanar with the two second end faces 2131 of the positive electrode portion 211 of each capacitor elements 21, and the two first side faces 1112 of the positive electrode end 11 can be coplanar with the two second side faces 2132 of the positive electrode portion 211 of each capacitor elements 21.

The laser welding area 3 is configured by a laser source capable of emitting a laser beam to perform laser welding on the positive electrode end 11 of the lead frame 1 and the positive electrode portion 211 of each capacitor elements 21 to form a fusion connection therebetween. Further, the laser welding area 3 is formed on the first outer periphery 111 and the second outer periphery 213. In the embodiment, the number of the laser welding area 3 is two, and are respectively formed on the two first end faces 1111 and the two second end faces 2131, and each laser welding area 3 has a width W.

Thus, the a method for manufacturing the aforementioned stacked aluminum electrolytic capacitor includes the following steps. The aforementioned lead frame 1 and the aforementioned capacitor set 2 are provided. A laser source is used for emitting a laser beam to perform laser welding on the positive electrode end 11 and the positive electrode portion 211 to form a fusion connection therebetween to provide the laser welding area 3 descripted previously.

The laser source may be a continuous wave laser or a pulsed laser, and the laser beam has a diameter between 0.05 mm to 0.2 mm, an energy between 0.1 J to 10 J, and an instantaneous output power between 500 W to 2000 W. In the embodiment, the laser source is single and is configured to perform a single laser spot welding on the positive electrode end 11 and the positive electrode portion 211, and the laser spot welding has a spot between 0.25 mm and 0.4 mm.

Further, the laser beam is cylindrical or conical, and the laser welding is continuously performed in a way that a point moving track fomes in a line or a line moving track forms in a plane to form the laser welding area 3, and a width of the moving track is 1 cm.

The advantages of using laser welding to form the laser welding area 3 are as follows:
1. Minimize the heat absorption of the positive electrode end 11 and the positive electrode portion 211, the metallographic change range of the heat-affected zone is small, and the deformation caused by heat conduction can also be minimized;
2. The bead aspect ratio of laser deep penetration fusion welding can reach 10:1;
3. A wide range of materials that can be welded, and various heterogeneous materials can also be joined with each other, and the welding effect is good.

Furthermore, a gap 214 is formed between the first outer periphery 111 and the second outer periphery 213, and the gap 214 is dip-coated fluoride anti-blushing agent, such as SFE-X14H or FE-DO2HL produced by AGC SEIMI CHEMICAL Co., LTD. at least three times to effectively block the ingress of moisture from the outside and reduce the rate of capacity change. When the stacked aluminum electrolytic capacitor is used in automotive capacitors, it can meet the AECQ-200 automotive standard, and improve the reliability of temperature with humidity, slow down the rate of capacity change and stabilize the dissipation factor.

Figure 5:
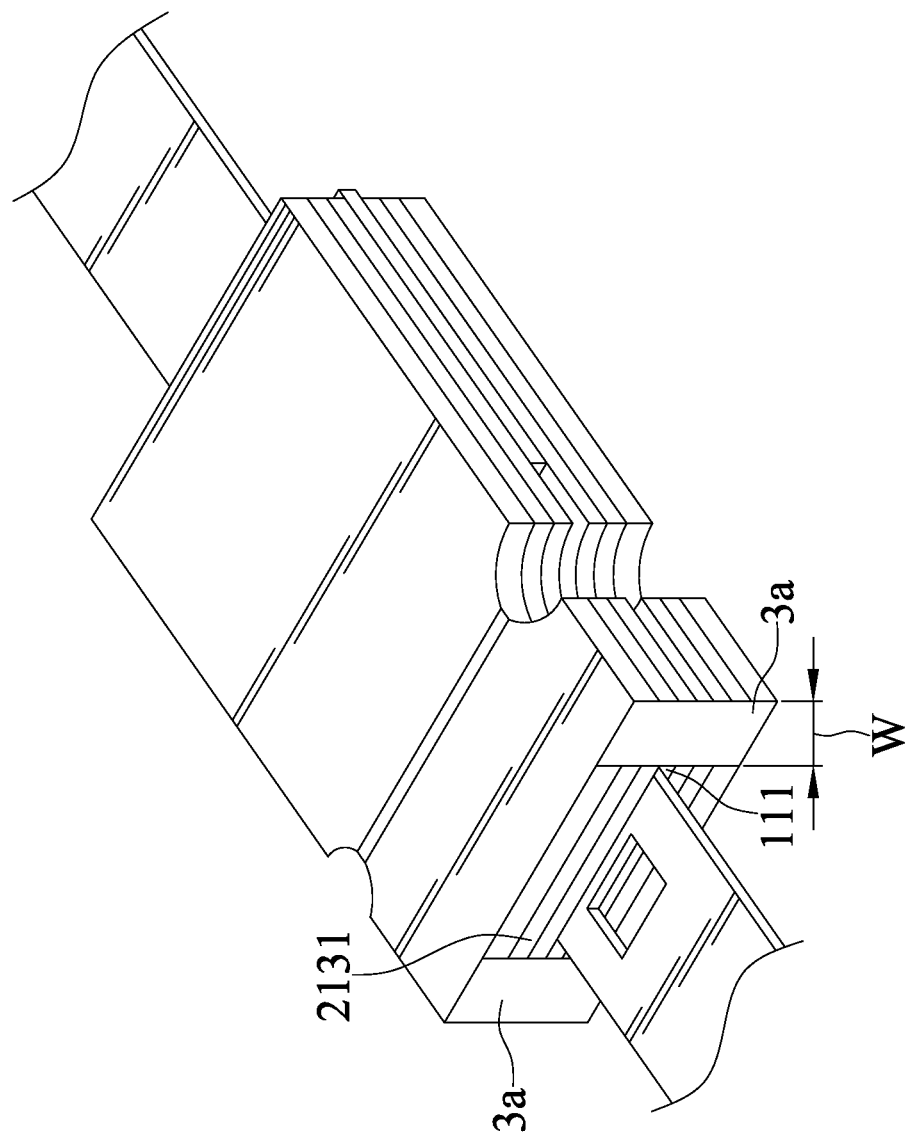
FIG. 5 is a perspective view of a stacked aluminum electrolytic capacitor of a second embodiment according to the present invention.

FIG. 5 shows a stacked aluminum electrolytic capacitor of a second embodiment according to the present invention. The second embodiment is substantially the same as the first embodiment except that the width W of the laser welding area 3a of the second embodiment is greater than the width W of the laser welding area 3 of the first embodiment, that is, the laser welding is continuously performed in a way that a line moving track forms in a plane to form the laser welding area 3a.

Figure 6:
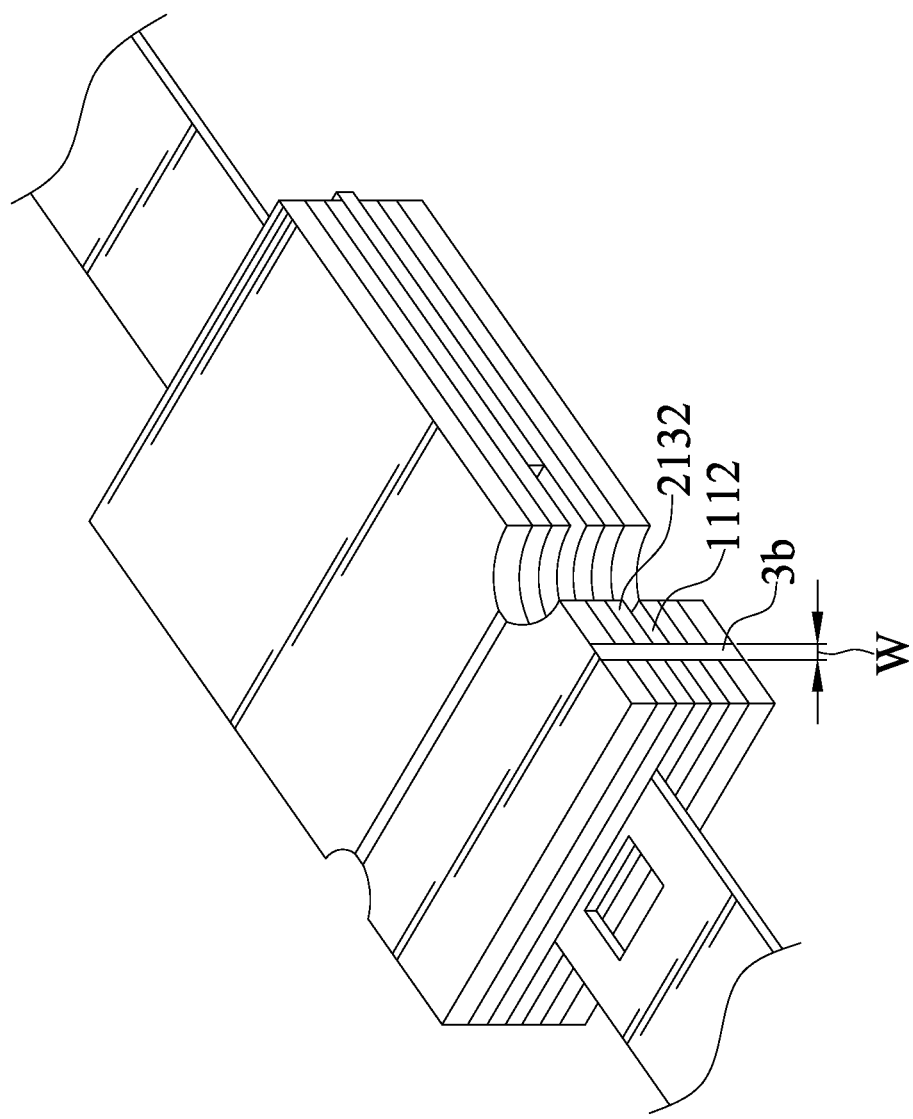
FIG. 6 is a perspective view of a stacked aluminum electrolytic capacitor of a third embodiment according to the present invention.
Figure 7:
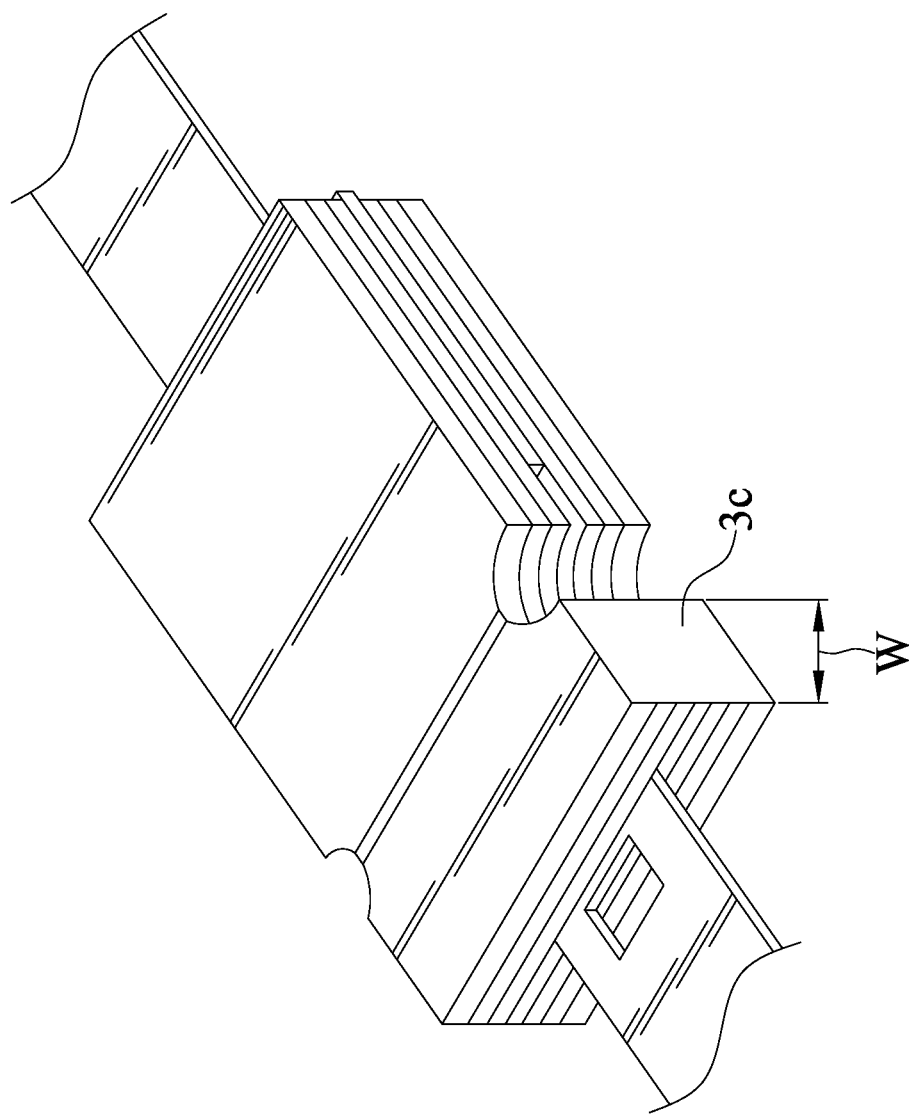
FIG. 7 is a perspective view of a stacked aluminum electrolytic capacitor of a fourth embodiment according to the present invention.

FIG. 6 shows a stacked aluminum electrolytic capacitor of a third embodiment according to the present invention. The third embodiment is substantially the same as the first embodiment except that the laser welding area 3b is formed on the first side face 1112 and the second side face 2132. FIG. 7 shows a stacked aluminum electrolytic capacitor of a fourth embodiment according to the present invention. The fourth embodiment is substantially the same as the third embodiment except that the width W of the laser welding area 3c of the second embodiment is greater than the width W of the laser welding area 3b of the first embodiment, that is, the laser welding is continuously performed in a way that a line moving track forms in a plane to form the laser welding area 3c.

In summary, the laser welding area 3; 3a; 3b; 3c is configured by a laser source capable of emitting a laser beam to perform laser welding on the positive electrode end 11 and the positive electrode portion 211 to form a fusion connection therebetween, and the laser beam is cylindrical or conical, so that the stacked aluminum electrolytic capacitor can effectively reduce the number of welding passes and increase the strength and tensile strength of the positive electrode end 11 and the positive electrode portion 211 while maintaining low impedance. In addition, in the automotive standard vibration resistance 5G test, the aluminum electrolytic capacitors through laser welding have a higher pass rate. After the test, the leakage current change and the impedance change range are better than the resistance-welded capacitors.

Although specific embodiments have been illustrated and described, numerous modifications and variations are still possible without departing from the scope of the invention. The scope of the invention is limited by the accompanying claims.

The invention claimed is:

1. A method, comprising:
providing a lead frame including a positive electrode end and a negative electrode end spaced from the positive electrode end, and a capacitor set including a plurality of stacked capacitor elements each having a positive electrode portion electrically connected to the positive electrode end and a negative electrode portion electrically connected to the negative electrode end; and
using a laser source emitting a laser beam to perform laser welding on the positive electrode end and the positive electrode portion to form a fusion connection therebetween to provide at least one laser welding area, wherein the positive electrode end of the lead frame has a first outer periphery, wherein the positive electrode portion of each capacitor elements has a second outer periphery, wherein the at least one laser welding area is formed on the first outer periphery and the second outer periphery, wherein a gap is formed between the first outer periphery and the second outer periphery, and wherein the gap is dip-coated in a fluoride anti-blushing agent at least three times.

2. The method as claimed in claim 1, wherein the laser source is a continuous wave laser or a pulsed laser.

3. The method as claimed in claim 1, wherein the laser beam has a diameter between 0.05 mm to 0.2 mm, wherein the laser beam has an energy between 0.1 J to 10 J, and wherein the laser beam has an instantaneous output power between 500 W to 2000 W.

4. The method as claimed in claim 1, wherein the laser source is single and is configured to perform a single laser spot welding on the positive electrode end and the positive electrode portion, and wherein the laser spot welding has a spot diameter between 0.25 mm and 0.4 mm.

5. The method as claimed in claim 1, wherein the laser beam is cylindrical or conical.

6. The method as claimed in claim 1, wherein the laser welding is continuously performed in a way that a point moving track forms in a line or a line moving track forms in a plane to form the at least one laser welding area, and wherein the point moving track or the line moving track has a width which is 1 cm.

* * * * *